United States Patent [19]

Frankel

[11] 4,269,499
[45] * May 26, 1981

[54] TWO-PIECE QUADRIPOD FOR CAMERAS

[76] Inventor: Robert S. Frankel, 11905 Woodbridge St., #10, Studio City, Calif. 91604

[*] Notice: The portion of the term of this patent subsequent to Mar. 11, 1997, has been disclaimed.

[21] Appl. No.: 106,405

[22] Filed: Dec. 26, 1979

[51] Int. Cl.³ .......................................... G03B 17/00
[52] U.S. Cl. .................................. 354/293; 248/163; 248/187
[58] Field of Search .......................... 354/81, 82, 293; 248/473, 149, 441, 188.4, 163, 164, 431, 346, 176, 187, 453; 24/3 E, 10 A, 81 SF, 73 PF

[56] References Cited

U.S. PATENT DOCUMENTS

| 651,521 | 6/1900 | Bigsby-Chamerlin | 248/187 |
|---|---|---|---|
| 3,683,462 | 8/1972 | Voigt | 24/815 K |
| 3,704,848 | 12/1972 | Trebes et al. | 248/188.4 |
| 4,192,601 | 3/1980 | Frankel | 354/293 |

FOREIGN PATENT DOCUMENTS 1299053 6/1962 France ..................................... 248/163

*Primary Examiner*—John Gonzales
*Attorney, Agent, or Firm*—Allan M. Shapiro

[57] ABSTRACT

The camera quadripod is formed of a pair of bipods, each having a pair of adjustable legs and each having a pair of arms which can embrace a camera. The pair of bipods cooperate together in conjunction with the camera body so that they become a quadripod and serve to support the camera. The adjustment of the legs controls the orientation of the camera. The bipods are small enough to be carried in the photographer's pocket when not in use, and are quickly and easily engaged on and removed from the camera body.

5 Claims, 3 Drawing Figures

TWO-PIECE QUADRIPOD FOR CAMERAS

BACKGROUND OF THE INVENTION

The camera quadripod of this invention is a camera support and thus is broadly in the field of camera tripods and similar structures. The field broadly includes those devices which engage in the threaded support hole provided on most cameras. However, the camera quadripod of this invention directly engages on the camera body.

In a number of cases, it is necessary or helpful to physically support a camera independently of the support physically provided by the photographer.

To provide this support, each camera body usually is furnished with a screwthreaded opening, usually called the tripod socket. Tripods and other similar supports have a screwthreaded stud which fits into this opening. The three legs of the tripod engage the ground or other supporting surface and, accordingly, the camera is supported. A number of tripod designs are available, and choice is usually between a very portable, lightweight unit and one that is sturdy and rigid.

In addition to tripods, other support devices have been designed for engaging in the tripod socket of the camera to provide camera support. However, each of these devices is burdened by size, complexity, or the need for securement on other support structures. Thus, there is need for a camera support structure which is small and light enough to fit into the photographer's pocket, readily engaged on and removed from the camera body, convenient and easy to use, and which provides proper support of the camera.

SUMMARY OF THE INVENTION

In order to aid in the understanding of this invention, it can be stated in essentially summary form that it is directed to a camera quadripod which is comprised of a pair of bipods, each of the bipods being for engaging directly on the camera body to support the camera. Each of the bipods is provided with a pair of arms to embrace the camera body and a pair of adjustable legs with feet to engage upon a support.

It is thus an object of this invention to provide a camera support structure which is light and pocket-sized so that it can be used almost anywhere. It is another object to provide a quadripod which has four feet to assure stability of the camera supported thereon, with distribution of the weight over the four feet of the camera quadripod, to support the camera even with a heavy lens thereon. It is another object to provide a camera quadripod which can properly engage the camera body for proper support and for convenient attachment and removal of the quadripod from the camera. It is a further object to provide a camera quadripod which can be placed on the camera body to engage the camera body for support of the camera either for transverse or upright positioning of the camera body so that photographs can be taken in either orientation.

The features of the present invention which are believed to be novel are set forth with particularity in the appended claims. The present invention, both as to its organization and manner of operation, together with further objects and advantages thereof, may be understood best by reference to the following description, taken in conjunction with the accompanying drawings.

DESCRIPTION OF THE PREFERRED EMBODIMENT

Figure 1:
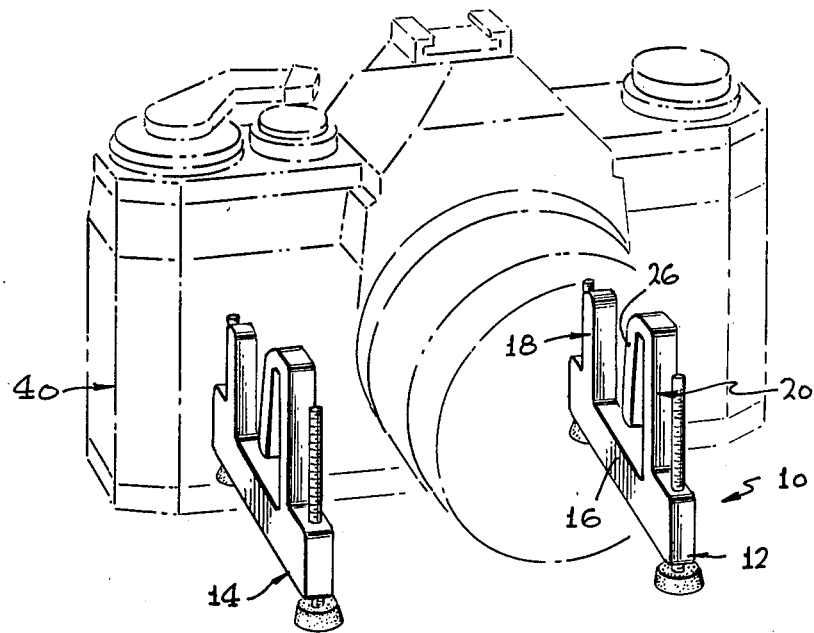
FIG. 1 is a perspective view of the preferred embodiment of the camera quadripod of this invention, showing a camera in dashed lines to illustrate the manner of support of the camera body in the horizontal orientation and to show the cooperation between the two bipods which form the two-piece quadripod for cameras.
Figure 3:
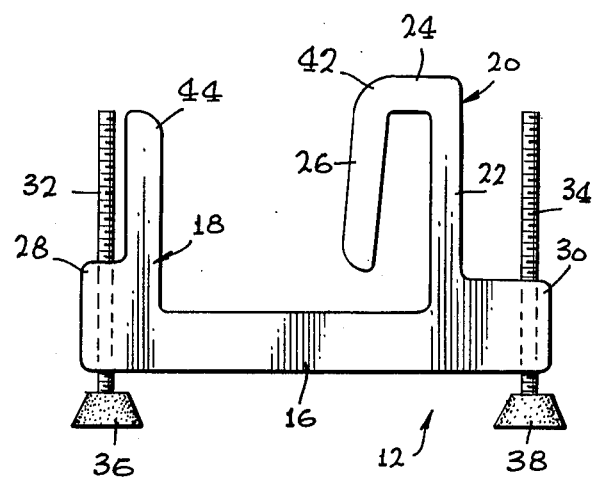
FIG. 3 is a full scale side elevational view of one of the bipods.
Figure 2:
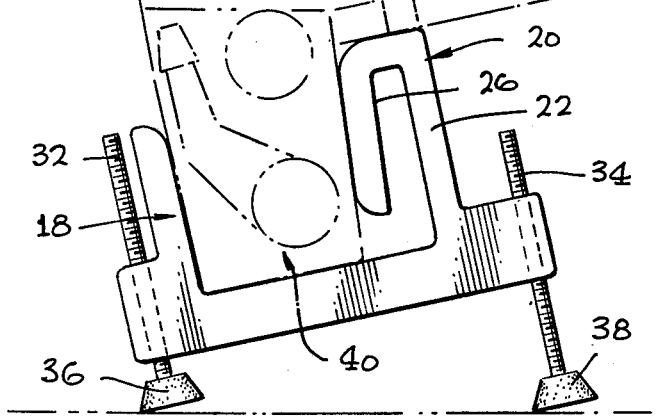
FIG. 2 is a side elevational view of the preferred embodiment of the camera quadripod of this invention, showing one of the bipods of the quadripod embracing the camera body for taking a photograph in the upright orientation, the other bipod being behind and hidden by the bipod shown.

The preferred embodiment of the two-piece quadripod for cameras of this invention is generally indicated at 10 in FIG. 1. It is comprised of two identical bipods 12 and 14 which are described in more detail below. Each of the bipods has a crossbar 16 on which are secured a pair of arms indicated generally at 18 and 20. Rear arm 18 is an upwardly directed single short arm. Front arm 20 is a long arm, i.e., slightly longer than arm 18, having an upwardly directed portion 22 extending upwardly from the crossbar 16, a short connecting bar portion 24 extending from the upper end of portion 22 back toward rear arm 18, and a downwardly directed end portion 26 extending from the rear of the connecting bar portion 24. Portion 26 is slanted rearwardly, in its unstressed unflexed condition prior to attachment to the camera, in a direction to close the space defined between arms 18 and 20.

Bosses 28 and 30 are located at opposite ends of the crossbar 16 at the respective bases of arms 18 and 20 and are each provided with a threaded hole therethrough generally parallel to the direction of arm 18. Legs 32 and 34 are respectively threaded through the upright holes in the bosses. The lower ends of the legs terminate in feet 36 and 38, respectively, which are preferably in the form of rubber feet molded on or otherwise positioned on the lower ends of the legs.

The overall dimensions of each bipod are such that the bipods are small enough to fit into the photographer's pocket for portability and ready availability when needed. Thus, the crossbar 16 is only slightly longer than the width of a conventional camera body, arms 18 and 20 are shorter than the height of such body, and legs 32 and 34 are conveniently about the same length as arms 18 and 20 to allow for sufficient angular adjustments without significantly raising the camera body.

Each of the bipods 12 and 14, with the exception of their legs and feet, are preferably made of synthetic polymer composition material for lightness and strength, and preferably in the rectangular or square cross-section configuration shown. The spacing between arms 18 and 20 is such that the quadripod properly fits most present-day 35 millimeter, single lens reflex cameras. The proper fit is one where the camera body 40 can rest on crossbar 16, engage against the rear arm 18 and press against the inwardly slanted end portion 26 of the front arm 20 with just sufficient compressive force to cause the slanted portion 26 to resiliently bend slightly from its juncture with connection bar portion 24, such resilient joint being indicated at 42. In those cases where the camera body size is such as to exceed the bending capacity of joint 42, portion 22 can bend to accommodate. Thus, the bipod is maintained in engagement with the camera body and the camera is properly supported.

The threaded securement of legs 32 and 34 into the corresponding bosses permit the rotation of the legs to adjust the extension thereof below crossbar 16. The legs are rotated into the desired position, preferably a position wherein all four of the feet engage a supporting surface. In this way, proper camera support is achieved, and orientation is adjusted.

The quadripod may be made of light, malleable metal such as aluminum and it may be formed of round stock. Furthermore, resilient covering may be provided to prevent scratching, although the rounded entrant surfaces at 42 and 44 normally suffice to avoid that problem.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A camera quadripod comprising:
   a pair of substantially identical bipods, each of said bipods having first and second spaced arms one of said arms being resilient and longer than the other of said arms;
   a crossbar interconnecting said arms so that a camera body can be engaged on said crossbar and resiliently detachably embraced within said arms for support of the camera body;
   said resilient arm including an upwardly directed portion extending upwardly from said crossbar and having an upper end, a connecting bar portion extending from said upper end toward said other arm, and a slanted portion extending downwardly from said connecting bar portion toward said other arm; and
   each of said bipods having first and second spaced support legs, at least one of said legs on each of said bipods being adjustable for supporting said quadripod in a selected position and for supporting a camera engaged within the arms of and supported by said quadripod in a selected position.

2. The camera quadripod of claim 1 wherein both of said arms have rounded entrant surfaces for receiving said camera body.

3. The camera quadropid of claim 2 wherein said resilient arm is longer than the other of said arms.

4. The camera quadripod of claim 3 wherein said support legs are each individually adjustable with respect to the bipod on which they are mounted.

5. The camera quadripod of claim 4 wherein there is a pair of screwthreaded openings in each of said bipods, and said legs are screwthreaded into said openings for adjustment of said legs with respect to said arms, said legs lying substantially parallel to at least one of said arms.

* * * * *